United States Patent [19]

Zimmermann

[11] Patent Number: 4,663,553

[45] Date of Patent: May 5, 1987

[54] STATOR LAMINATED CORE ATTACHMENT IN AN ELECTRICAL MACHINE

[75] Inventor: Hans Zimmermann, Monchaltorf, Switzerland

[73] Assignee: BBC Brown, Boveri & Company, Limited, Baden, Switzerland

[21] Appl. No.: 741,137

[22] Filed: Jun. 4, 1985

[30] Foreign Application Priority Data

Jun. 12, 1984 [CH] Switzerland ............... 2824/84

[51] Int. Cl.⁴ .................. H02K 1/18; H02K 3/24; H02K 15/14
[52] U.S. Cl. ..................... 310/258; 29/546; 248/51
[58] Field of Search ............. 310/42, 51, 91, 216, 310/217, 218, 254, 258; 248/606, 609, 635; 29/596

[56] References Cited

U.S. PATENT DOCUMENTS

| | | | |
|---|---|---|---|
| 2,199,351 | 4/1940 | Taylor | 310/258 |
| 2,554,226 | 5/1951 | Taylor | 310/258 |
| 2,643,351 | 6/1953 | Feiertag | 310/258 |
| 2,911,552 | 11/1959 | Barlow | 310/258 |
| 2,973,442 | 2/1961 | Wilson | 310/258 |
| 3,652,889 | 3/1972 | Reese et al. | 310/218 |
| 4,207,484 | 6/1980 | Krecker | 310/258 |
| 4,425,523 | 1/1984 | Detinko et al. | 310/258 |
| 4,469,973 | 9/1984 | Guyot et al. | 310/51 |

FOREIGN PATENT DOCUMENTS 2042561 12/1971 Fed. Rep. of Germany ...... 310/216

Primary Examiner—Patrick R. Salce
Assistant Examiner—D. L. Rebsch
Attorney, Agent, or Firm—Oblon, Fisher, Spivak, McClelland & Maier

[57] ABSTRACT

A stator laminated core (1) of a horizontal-axis electrical machine is supported by means of at least two parallel bearing plates (3), perpendicular to the axis of the electrical machine and at a distance from each other. In order to minimize vibrations and thermal stresses occurring during the operating state of the electrical machine, the bearing plates (3) are of annular design and are connected to the bottom casing section (8) only in two regions of their horizontal plane of symmetry, on either side, via vertical linear extensions (4) by means of attachment parts (5). By far the greatest part of the circumference of the bearing plates (3) is at a distance from the bottom casing section (8) and the top casing section (9). The stator laminated core (1) is braced in the bearing plates (3) by means of attachment wedges (6) evenly distributed around its entire circumference. The attachment parts (5) include attachment plates (15) which are each welded to the extensions (4) of the bearing plates (3). Reinforcing, horizontal-axis tube lengths (14) are welded to the attachment plates (15). The attachment according to the invention of the stator laminated core (1) allows easy accessibility of the structural parts to be welded and ensures a good quality of the welds.

16 Claims, 6 Drawing Figures

STATOR LAMINATED CORE ATTACHMENT IN AN ELECTRICAL MACHINE

FIELD OF THE INVENTION

The invention relates to an attachment of the stator laminated core of a horizontal-axis electrical machine.

BACKGROUND OF THE INVENTION

In the brochure by the company Brown Boveri & Cie. "Luftgekühlte Turbogeneratoren" (Air-cooled turbon-generators), ZKN/G248, undated, a horizontal-axis electrical machine is presented in which the stator laminated core is mounted in recess of approximately ten perpendicularly arrange bearing plates, the recesses having the shape of a regular polygon, which correspond to the outer prismatic shape of the stator laminated core. Wedges used as attachment elements, but are arranged only in the region of the bottom casing section. The bearing plates are of rectangular design at the bottom, and assume the bearing function of the stator body.

The invention is based on the problem of providing a horizontal-axis electrical machine in which the undesirable effects of vibrations and thermal stresses occurring are reduced, and the structural parts to be welded are easily accessible during production.

ADVANTAGES OF THE INVENTION

The invention has the following advantages:

Radical thermal expansions of the stator laminated core in the operating state of the electrical machine produce approximately symmetrical tensile stresses in the annular bearing plates and evenly distributed radial compressive forces in the attachment wedges.

Axial thermal expansions of the stator laminated core and the resultant stresses are only transferred to the extensions of the annular bearing plates, and they are balanced out by slight deformation of the extensions.

The support of the annular bearing plates in the bottom casing section, just in the region of its horizontal plane of symmetry, allows an exact prior calculation of the stresses which occur in these structural parts.

The relatively high radial vibrations in the stator laminated core act only in the horizontal axial plane and are greatly reduced by the compliance of the casing, so that vibrations in the machine foundations are greatly reduced.

The relatively small tangential laminated body vibrations are likewise reduced by the casing.

The preferred embodiment of the invention accomplishes a secure mechanical connection between the annular bearing plates and the bottom casing section, as the structural parts to be welded are easily accessible from the outside, and perfect quality of the welded joints is ensured.

The invention offers the advantage that the attachment wedges are securely mounted with the slugs before their welding.

The support of the wedges on the slugs ensures a good welded joint between stator laminated core and the bearing plates.

The arrangement of cross-walls disclosed herein has the advantage that the rigidity of the bottom and top casing sections is improved.

The connection of the structural parts by means of welding disclosed herein is economical and ensures good strength properties.

BRIEF DESCRIPTION OF THE DRAWINGS

The invention is explained in more detail below with reference to an exemplary embodiment illustrated in the drawing, in which.

DETAILED DESCRIPTION OF THE PRESENTLY PREFERRED EMBODIMENT

Figure 1:
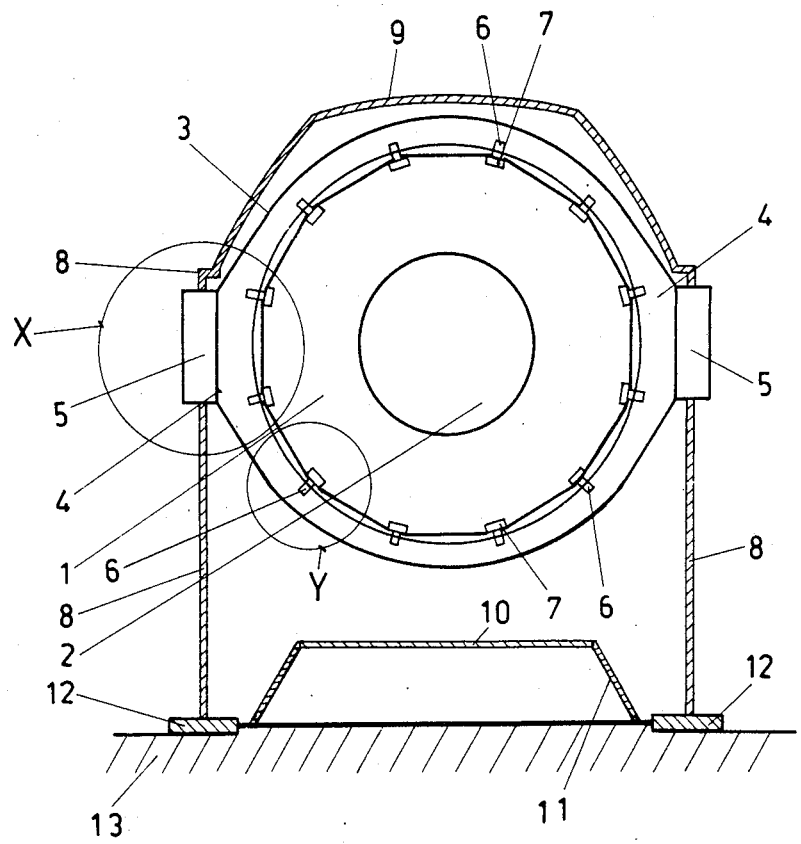
FIG. 1 shows a vertical section through the electrical machine according to the invention.

In FIG. 1, a stator laminated core is denoted by 1, a hole for the rotor part by 2 and an annular bearing plate by 3. The annular bearing plate 3 has extensions 4 on either side in the region of its horizontal plane of symmtry. Each of the extensions 4 of the bearing plate 3 is mechanically firmly connected to a bottom casing section 8 via an attachment part 5. The attachment parts 5 are arranged in the region of the horizontal plane of symmetry.

In FIG. 1, the bottom casing section 8 and a top casing section 9 are represented in cross-section, the stator laminated core 1 in plan view and the annular bearing plate 3 likewise in plan view. The electrical machine is supported on a foundation 13 via footplates 12. Oblique support plates 11 are arranged in a casing base 10 for mechanical reinforcement. It can be seen in FIG. 1 that the stator laminated core 1 is supported in the annular bearing plate 3 just by means of attachment wedges 6 evenly distributed around its entire circumference and that the remaining—by far greater part of the circumference of the stator laminated core 1—is at a distance from the annular bearing plate 3.

In FIG. 1, just one annular bearing plate 3 is represented. In the electrical machine according to FIG. 1, at least two bearing plates 3, perpendicular to the axis of the electrical machine and at a distance from each other, are provided. Depending on the size of the electrical machine, there may be four to six bearing plates 3.

It can likewise be seen in FIG. 1 that the annular bearing plate 3 is connected to the bottom casing section 8 of the electrical machine only in the region of its horizontal plane of symmetry by means of the attachment parts 5 arranged on either side and that there is an empty space between the outer circumference of the bearing plate 3 and inner surfaces of the bottom casing section 8 and the top casing section 9.

In the present exemplary embodiment, the circumference of the stator laminated core 1 is designed as a polygon.

Figure 2:
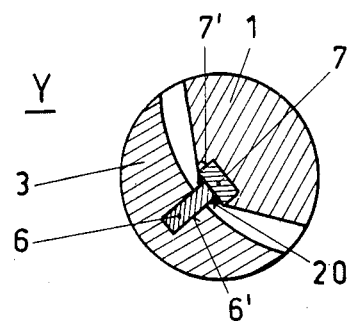
FIG. 2 shows an enlarged representation of the arrangement of an attachment wedge according to FIG. 1.

For better illustration, FIG. 2 shows an enlarged representation of the wedge attachment of the stator laminated core 1 in the annular bearing plate 3 according to FIG. 1. It is possible to see that the bearing plate 3 has in its inner circumference recesses 6' for the wedges 6. The wedges 6 are mounted, in the recesses 6'. Arranged in recesses 7' in the stator laminated core 1 or slugs 7, on which the attachment wedges 6 are supported. The slugs 7 can, on the one hand, only be located in the region of the wedges 6, but reasons of production engineering make it expedient to provide the recesses 7' over the entire axial length of the station laminated core 1, so that the slugs 7 likewise extend over the entire length of the stator laminated core 1. To increase the mechanical stability of the machine structure, attachment wedges 6 and slugs 7 are joined together by means of welds 20.

Figure 3:
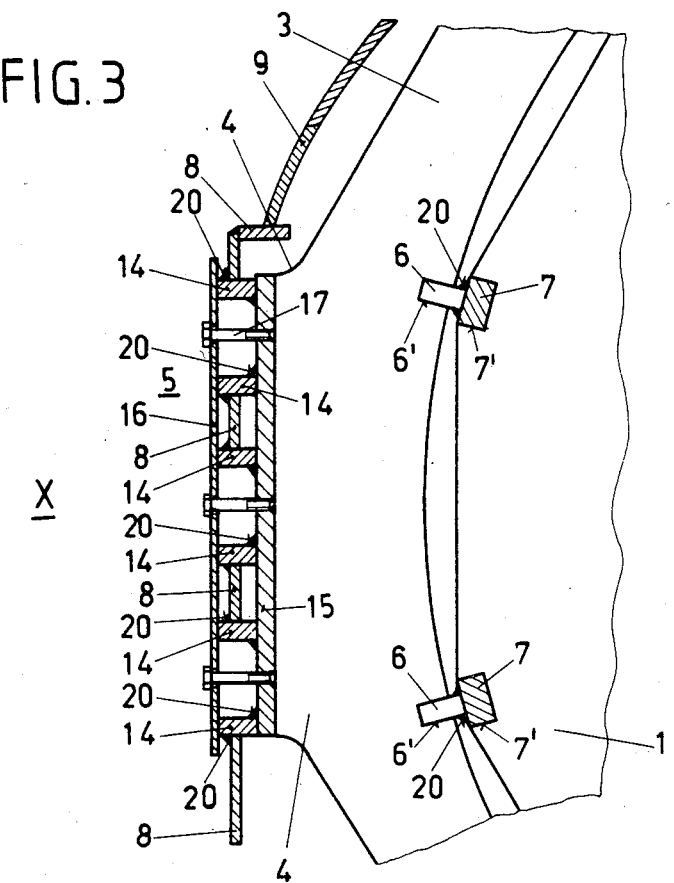
FIG. 3 shows an enlarged representation of the attachment part according to FIG. 1.

FIG. 3 shows an enlarged representation of a vertical section through the attachment part 5 and a partial plan view of the annular bearing plate 3 and the stator laminated core 1. The attachment part 5 in the bottom casing section 8 consists of a vertically extending attachment plate 15 which is welded to the extension 4 of the bearing plate 3. The welding is not shown in FIG. 3. Arranged on the attachment plate 15 are a number of horizontally disposed tube lengths 14 which are welded on one side to the attachment plate 15 and on the other side to the bottom casing section 8. To close off the tube length 14 from the outside, a terminal plate 16 is provided. The terminal plate 16 is secured by means of screws 17 in the attachment plate 15. Above the attachment part 5, the bottom casing section 8 has a pedestal-like shoulder on which the top casing section 9 is supported. The connection between the bottom casing section 8 and the top casing section 9 is only shown schematically in FIG. 3.

Figure 4:
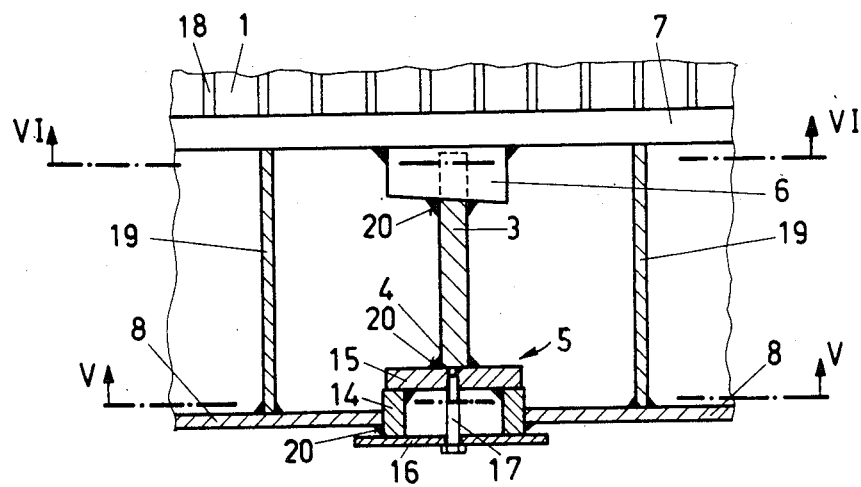
FIG. 4 shows a partial section through the horizontal plane of symmetry of the electrical machine.

FIG. 4 shows a partial section through the horizontal plane of symmetry of the electrical machine in the region of the attachment part 5. The stator laminated core 1 has radial cooling ducts 18. The slug 7, on which the attachment wedge 6 is supported, extends over the entire axial length of the stator laminated core 1. As already mentioned, the attachment wedge 6 is welded on one side to the slug 7 and on the other side to the bearing plate 3, by means of welds 20.

In FIG. 4, it is possible to see well the insertion of the attachment part 5 into the bottom casing section 8. Cross-walls 19 are arranged and secured perpendicularly to the bottom casing section 8. As can be seen clearly in FIG. 4, the cross-walls 19 are at a distance from the stator laminated core 1 and from the slugs 7 in order to avoid contact of the cross-walls 19 with the stator laminated core 1 in the operating state of the electrical machine due to radial thermal expansions of the stator laminated core 1.

Figure 5:
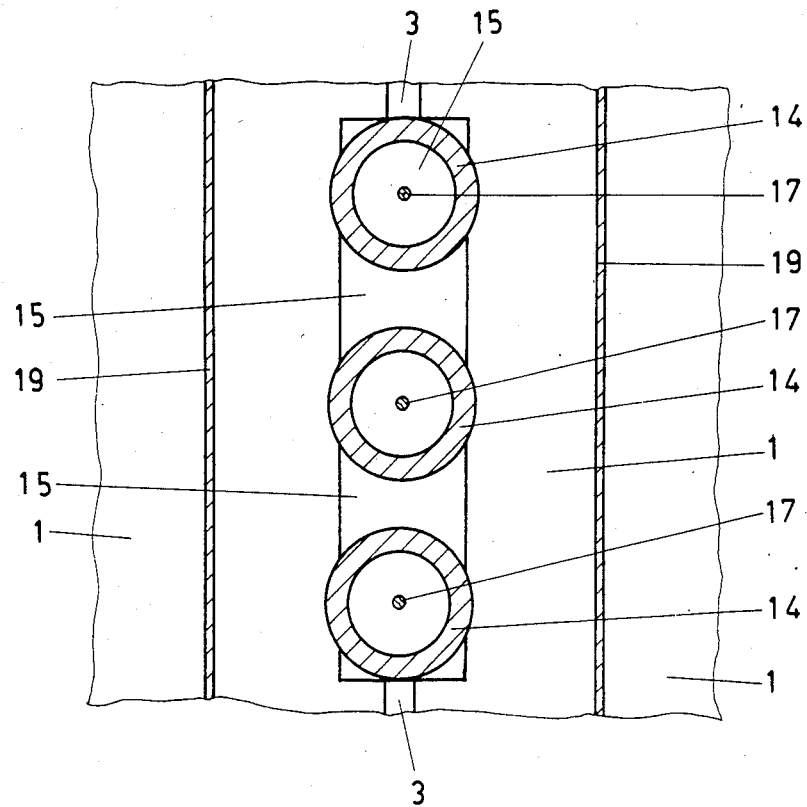
FIG. 5 shows a vertical section through the attachment part according to FIG. 4.

FIG. 5 shows a vertical section through the attachment part 5 and a partial plan view of the stator laminated core 1 according to FIG. 4.

In the exemplary embodiment according to FIG. 5, three tube lengths 14 are arranged perpendicularly on the attachment plate 15. It goes without saying that less or more than three tube lengths 14 may be arranged on the attachment plate 15, depending on the desired mechanical stability of the attachment part 5. For reasons of better clarity, the radical cooling ducts 18 in the stator laminated core 1 are not drawn in in FIG. 5.

Figure 6:
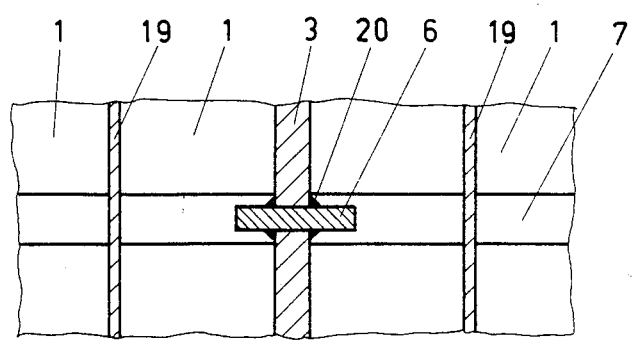
FIG. 6 shows a vertical section through an attachment wedge according to FIG. 4.

FIG. 6 shows a vertical section through an attachment wedge 6 and a partial plan view of the stator laminated core 1 according to FIG. 4. For reasons of better clarity, the radical cooling ducts 18 in the stator laminated core 1 are likewise not shown.

I claim:

1. A horizontal axis electrical machine comprising:
   (a) a stator laminated core having a horizontal axis and an outer circumference;
   (b) at least two annular bearing plates surrounding said stator laminated core and spaced therefrom;
   (c) a pluraity of attachment wedges bracing said stator laminated core in said at least two annular bearing plates, said plurality of attachment wedges being distributed over the entire outer circumference of said stator laminated core;
   (d) a casing surrounding said at least two annular bearing plates; and
   (e) means for connecting each of said at least two annular bearing plates to said casing, said means comprising:
      (i) a plurality of attachment plates, each one of said plurality of attachment plates being mechanically firmly connected to a corresponding one of said two annular bearing plates, and
      (ii) a plurality of horizontally disposed tube lengths mechanically firmly connected to each one of said attachment plates and projecting outwardly therefrom.

2. A horizontal axis electrical machine as recited in claim 1 wherein said at least two annular bearing plates are perpendicular to the axis of said stator laminated core and are spaced from each other, each one of said at least two annular bearing plates having an extension for the support of said stator laminated core on each of its sides in the region of the horizontal plane of symmetry of the electrical machine.

3. A horizontal axis electrical machine as recited in claim 2 wherein:
   (a) each one of said extensions is welded to a corresponding one of said attachment plates;
   (b) each one of said plurality of horizontally disposed tube lengths is welded to a corresponding one of said attachment plates; and
   (c) each one of said plurality of horizontally disposed tube lengths is welded to said casing.

4. A horizontal axis electrical machine as recited in claim 1 wherein:
   (a) a plurality of recesses are formed in the inner circumference of said at least two annular bearing plates and
   (b) each one of said plurality of attachment wedges is mounted in a corresponding one of said plurality of recesses.

5. A horizontal axis electrical machine as recited in claim 1 wherein:
   (a) a plurality of recesses are formed in the outer circumference of said stator laminated core;
   (b) said horizontal axis electrical machine further comprises a plurality of slugs;
   (c) each one of said plurality of slugs is arranged in a corresponding one of said plurality of recesses; and
   (d) each one of said plurality of attachment wedges is supported by a corresponding one of said plurality of slugs.

6. A horizontal axis electrical machine as recited in claim 5 wherein each one of said plurality of slugs extends over the entire axial length of said stator laminated core.

7. A horizontal axis electrical machine as recited in claim 1 and further comprising a plurality of reinforcing cross-walls projecting perpendicularly from the interior of said casing.

8. A horizontal axis electrical machine as recited in claim 2 wherein:

(a) said casing is divided into a bottom casing section and a top casing section and (b) said extensions are connected to said bottom casing section.

9. A horizontal axis electrical machine comprising:

(a) a stator laminator core having a horizontal axis, an outer circumference, and a plurality of recesses formed in its outer circumference;

(b) at least two annular bearing plates surrounding said stator laminated core and spaced therefrom;

(c) a plurality of attachment wedges bracing said stator laminated core in said at least two annular bearing plates, said plurality of attachment wedges being distributed over the entire outer circumference of said stator laminated core;

(d) a casing surrounding said at least two annular bearing plates;

(e) means for connecting each of said at least two annular bearing plates to said casing; and (f) a plurality of slugs, each one of said plurality of slugs being arranged in a corresponding one of said plurality of recesses and each one of said plurality of attachment wedges being welded to a corresponding one of said plurality of slugs.

10. A horizontal axis electrical machine as recited in claim 9 wherein said at least two annular bearing plates are perpendicular to the axis of said stator laminated core and are spaced from each other, each one of said at least two annular bearing plates having an extension for the support of said stator laminated core on each of its sides in the region of the horizontal plane of symmetry of the electrical machine.

11. A horizontal axis electrical machine as recited in claim 10 wherein said means comprise:

(a) a plurality of attachment plates, each one of said plurality of attachment plates being mechanically firmly connected to a corresponding one of said extensions, and (b) a plurality of horizontally disposed tube lengths mechanically firmly connected to each one of said attachment plates and projecting outwardly therefrom.

12. A horizontal axis electrical machine as recited in claim 11 wherein:

(a) each one of said extensions is welded to a corresponding one of said attachment plates;

(b) each one of said plurality of horizontally disposed tube lengths is welded to a corresponding one of said attachment plates; and (c) each one of said plurality of horizontally disposed tube lengths is welded to said casing.

13. A horizontal axis electrical machine as recited in claim 9 wherein:

(a) a plurality of recesses are formed in the inner circumference of said at least two annular bearing plates and (b) each one of said plurality of attachment wedges is mounted in a corresponding one of said plurality of recesses.

14. A horizontal axis electrical machine as recited in claim 9 wherein each one of said plurality of slugs extends over the entire axial length of said stator laminated core.

15. A horizontal axis electrical machine as recited in claim 9 and further comprising a plurality of reinforcing cross-walls projecting perpendicularly from the interior of said casing.

16. A horizontal axis electrical machine as recited in claim 15 wherein:

(a) said casing is divided into a bottom casing section and a top casing section and (b) said extensions are connected to said bottom casing section.

* * * * *